US008526989B2

(12) United States Patent
Morita

(10) Patent No.: US 8,526,989 B2
(45) Date of Patent: Sep. 3, 2013

(54) WIRELESS COMMUNICATION CONTROL METHOD, WIRELESS COMMUNICATION SYSTEM, AND RADIO CONTROL STATION

(75) Inventor: Motoki Morita, Tokyo (JP)

(73) Assignee: NEC Corporation, Tokyo (JP)

( * ) Notice: Subject to any disclaimer, the term of this patent is extended or adjusted under 35 U.S.C. 154(b) by 1182 days.

(21) Appl. No.: 12/056,829

(22) Filed: Mar. 27, 2008

(65) Prior Publication Data

US 2008/0248823 A1     Oct. 9, 2008

(30) Foreign Application Priority Data

Apr. 5, 2007   (JP) ................................ 2007-099427

(51) Int. Cl.
H04B 7/00    (2006.01)
(52) U.S. Cl.
USPC ............. 455/522; 455/69; 455/453; 370/318
(58) Field of Classification Search
USPC ...... 455/450–453, 552.1, 553.1, 69; 370/318
See application file for complete search history.

(56) References Cited

U.S. PATENT DOCUMENTS

| 2004/0179525 | A1* | 9/2004 | Balasubramanian et al. | 370/391 |
| 2006/0030301 | A1* | 2/2006 | Speight | 455/414.1 |
| 2007/0248060 | A1* | 10/2007 | Mooney et al. | 370/338 |
| 2007/0253363 | A1 | 11/2007 | Bachl et al. | |
| 2009/0010211 | A1 | 1/2009 | Sumasu et al. | |
| 2009/0154400 | A1 | 6/2009 | Nobukiyo et al. | |
| 2010/0315947 | A1* | 12/2010 | Wigren | 370/230 |
| 2011/0026462 | A1 | 2/2011 | Montojo et al. | |

FOREIGN PATENT DOCUMENTS

| JP | 2004-247950 A | 9/2004 |
| JP | 2006-179965 A | 7/2006 |
| JP | 2006-217173 A | 8/2006 |
| JP | 2006345401 A | * 12/2006 |
| JP | 2007-060086 A | 3/2007 |
| WO | WO-2006/046728 A1 | 5/2006 |
| WO | WO-2007/025138 A2 | 3/2007 |

OTHER PUBLICATIONS

3GPP TS 25.211 v7.0.0, Mar. 2006, 3rd Generation Partnership Project; Technical Specification Group Radio Access Network; Physical channels and mapping of transport channels onto physical channels (FDD) (Release 7).
3GPP TS 25.433 v7.3.0, Dec. 2006, 3rd Generation Partnership Project; Technical Specification Group Radio Access Network; UTRAN lub interface Node B Application Part (NBAP) signalling (Release 7).
Holma et al., WCDMA for UMTS, Revised edition, pp. 211-213, 2001.
Japanese Office Action issued for counterpart Japanese Application No. 2007-099427, dated Mar. 21, 2012 and its English translation.

* cited by examiner

Primary Examiner — Raymond Dean
(74) Attorney, Agent, or Firm — Dickstein Shapiro LLP

(57) ABSTRACT

A wireless communication control method includes the steps of transmitting data from a mobile station to a base station using a first resource assigned based on a first scheduling method, transmitting data from the mobile station to the base station using a second resource which is assigned based on a second scheduling method and is not used in the step of transmitting using the first resource, and instructing the base station to regulate use of the first resource in accordance with a second resource amount assigned as the second resource by a radio control station which controls use of resources in wireless communication for the base station, and a second resource usage as a ratio of a resource used in the step of transmitting using the second resource to the second resource amount. A wireless communication system and a radio control station are also disclosed.

44 Claims, 8 Drawing Sheets

WIRELESS COMMUNICATION CONTROL METHOD, WIRELESS COMMUNICATION SYSTEM, AND RADIO CONTROL STATION

This application is based upon and claims the benefit of priority from Japanese patent application No. 2007-099427, filed on Apr. 5, 2007, the disclosure of which is incorporated herein in its entirety by reference.

BACKGROUND OF THE INVENTION

The present invention relates to a wireless communication control technique and, more particularly, to a wireless communication control method, wireless communication system, and radio control station in a high-speed uplink packet transmission system.

In a third-generation mobile communication system including a mobile station, a base station, and a radio control station, a scheme using an uplink dedicated channel (DPCH: Dedicated Physical Channel) and an HSUPA (High Speed Uplink Packet Access) scheme as a high-speed uplink packet transmission scheme are available as schemes for transmitting data from a given mobile station to a base station in an uplink direction. These schemes are defined by the specifications (e.g., see 3GPP TS 25.211. v7.0.0. (2006-03) of 3 GPP (3rd Generation Partnership Project) serving as the third-generation mobile communication system international standardization project.

The DPCH is a dedicated physical channel which is made up from a DPCCH (Dedicated Physical Control Channel) which transmits a control signal and a DPDCH (Dedicated Physical Data Channel) which transmits data. A radio resource (indicating a base station reception power) is ensured for each mobile station in the radio control station. The data transmission rate can change depending on the uplink traffic and propagation environment. The transmission power is controlled in accordance with closed loop high-speed power control so as to make the reception quality of a base station constant.

On the other hand, the HSUPA scheme is made up from an E-DPCCH (Enhanced Dedicated Physical Control Channel) which transmits a control channel, an E-DPDCH (Enhanced Dedicated Physical Data Channel) which transmits data, and a DPCCH which transmits a pilot signal and a power control signal. The E-DPCCH and E-DPDCH are generically called an E-DPCH (Enhanced Dedicated Physical Channel). The radio resources are assigned to the interference and DPCH, and the remaining radio resources are used and scheduled between mobile stations at high speed, i.e., at an interval of 2 ms or 10 ms in the base station. The E-DPCH transmission power is controlled by adding a power offset determined by scheduling to the DPCCH transmission power based on the closed-loop high-speed power control.

When a mobile station transmits data to a base station using the DPCH or HSUPA scheme, the mobile station requests a radio control station to establish the DPCH (DPCCH in case of the HSUPA scheme). In this case, the radio control station performs AC (Admission Control) (e.g., see Harri Holma, Antti Toskala, W-CDMA FOR UMTS Revised Edition pp. 211-213, 2001). The AC is practiced using a cell load ρ given by:

$$\rho = \sum_i \left( \frac{SIR_i}{SF_i} \right) \quad (1)$$

where $SIR_i$ (Signal to Interference Ratio) is the target reception quality of the DPCH established by a mobile station i and indicates a necessary SIR to satisfy a target error ratio, $SF_i$ (Spreading Factor) is the diffusion ratio of the DPCH established by the mobile station i and takes different values for different transmission rates, and Z is the total sum of all established DPCHs. When the HSUPA scheme is used, a DPCCH load is added. When the mobile station requests to establish a new DPCH, a cell load upon establishing the DPCH is estimated as in inequality (2). When the estimated cell load is smaller than a predetermined threshold value, a request for establishing a DPCH is permitted by $$\sum_i \left( \frac{SIR_i}{SF_i} \right) + \frac{SIR_{new}}{SF_{new}} < \rho_{max,new,UL} \quad (2)$$

where $SIR_{new}$ and $SF_{new}$ are the SIR and SF of a new DPCH, respectively, and $\rho_{max,new,UL}$ is the AC threshold value. When the estimated cell load is equal to or larger than the predetermined threshold value, a DPCH establishment request is rejected. The AC threshold values are independently set for the DPCH and the DPCCH of the HSUPA scheme, respectively.

In the above third-generation mobile communication system, the AC regulates the DPCH in the radio control station. The base station measures the resource usages of the DPCH and HSUPA resources. The radio control station can know the RTWP (Received Total Wideband Power) representing the total reception power of the base station as the resource usage in the base station in accordance with a Common Measurement reported from the base station (e.g., see 3GPP TS 25.433, v 7.3.0. (2006 December)).

In the techniques relevant to the present invention, however, when independent wireless communication schemes are used in a mixed manner as in the DPCH scheme and the HSUPA scheme, and the resource used by one scheme (DPCH) increases, the resource usable by the other (HSUPA) decreases, thereby greatly degrading the throughput of the other (HSUPA) due to the following reason.

In case of DPCH and HSUPA, the resource usable by the HSUPA scheme is the rest of the resource used by the DPCH. Even if the remaining resource decreases, the radio control station cannot regulate the DPCH.

SUMMARY OF THE INVENTION

The present invention has been made to solve the conventional problem described above, and has as its object to prevent a decrease in throughput localized to either scheme even if independent wireless communication schemes are used in a mixed manner.

According to an aspect of the present invention, there is provided a wireless communication control method comprising the steps of transmitting data from a mobile station to a base station using a first resource assigned based on a first scheduling method, transmitting data from the mobile station to the base station using a second resource which is assigned based on a second scheduling method and is not used in the step of transmitting using the first resource, and instructing the base station to regulate use of the first resource in accordance with a second resource amount assigned as the second resource by a radio control station which controls use of resources in wireless communication for the base station, and a second resource usage as a ratio of a resource used in the step of transmitting using the second resource to the second resource amount.

According to another aspect of the present invention, there is provided a wireless communication system comprising a plurality of mobile stations, a base station which performs wireless communication with a mobile station in a cell using a resource assigned based on a predetermined scheduling method, and a radio control station which controls use of the resource in wireless communication for the base station, the mobile station comprising a first data transmission unit which transmits data to the base station using a first resource assigned based on a first scheduling method and a second data transmission unit which transmits data to the base station using a second resource which is assigned based on a second scheduling method and is not used in the first data transmission unit, and the radio control station comprising a resource control unit which instructs the base station to regulate use of the first resource in accordance with a second resource amount assigned as the second resource, and a second resource usage as a ratio of a resource used in the second data transmission unit to the second resource amount.

DESCRIPTION OF THE PREFERRED EMBODIMENTS

Exemplary embodiments of the present invention will be described with reference to the accompanying drawings.

First Exemplary Embodiment

A wireless communication system according to the first exemplary embodiment will be described with reference to FIG. 1.

Figure 1:
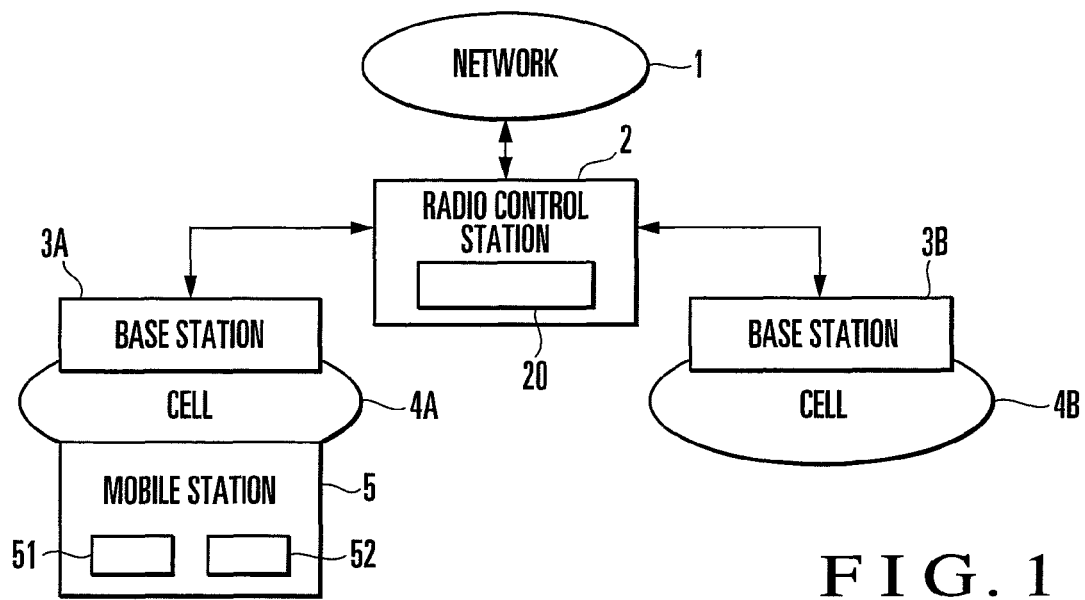
FIG. 1 is a block diagram showing the arrangement of a wireless communication system according to the first embodiment of the present invention.

The wireless communication system shown in FIG. 1 comprises a radio control station 2 directly connected to a wired network 1, base stations 3A and 3B connected to the radio control station 2, cells 4A and 4B respectively forming the base stations 3A and 3B, and a mobile station 5 which wirelessly communicates with one of the base stations 3A and 3B. FIG. 1 shows a state in which one mobile station 5 belongs to the cell 4A formed by the base station 3A.

Note that only two base stations are illustrated in FIG. 1, but the number of base stations may be three or more. Each base station forms one cell. However, one base station can form a plurality of cells. A plurality of mobile stations may belong to one cell. In addition, the radio control station 2 and the base stations 3A and 3B are illustrated as independent devices, but may be configured as one device.

The radio control station 2 controls setting of a radio channel for the mobile station 5 connected to the base station 3A or 3B. The radio control station 2 also controls the use of resources in wireless communication for the base stations 3A and 3B.

The base stations 3A and 3B have the same arrangement and respectively form the cells 4A and 4B. The base stations 3A and 3B can perform wireless communications with the mobile station 5 in the respective cells using the resources assigned based on a predetermined scheduling method.

The cells 4A and 4B represent areas in which the base stations 3A and 3B can wirelessly communicate with the mobile station 5.

The mobile station 5 is wirelessly connected to the base station 3A and can transmit speech or packet data in the uplink direction.

The mobile station 5 comprises a first data transmission unit 51 which transmits data to the base station 3A or 3B using the first resource assigned based on the first scheduling method and a second data transmission unit 52 which transmits data to the base station 3A or 3B using the second resource which is assigned based on the second scheduling method and is not used in the first data transmission unit 51.

The radio control station 2 comprises a resource control unit 20 which instructs the base stations 3A and 3B to regulate use of the first resource in accordance with the second resource amount assigned as the second resource and the second resource usage representing the ratio of the resource used in the second data transmission unit 52 to the total second resource amount.

According to this exemplary embodiment, assume that the first resource amount of the first data transmission unit 51 is large, that the resource amount of the second data transmission unit 52 is small, and that radio resource usable by the second data transmission unit 52 is short. In this case, the use of the first resource is regulated, and the second resource is increased. For this reason, the throughput of the second data transmission unit 52 increases. Even if independent wireless communication schemes are used in a mixed manner, the decrease in throughput caused by resource localized to either scheme can be prevented.

Second Exemplary Embodiment

A wireless communication system according to the second exemplary embodiment of the present invention will be described with reference to FIG. 2.

The second exemplary embodiment is a configuration example of the first exemplary embodiment. The wireless communication system of this exemplary embodiment employs a W-CDMA mobile communication scheme used as a radio access scheme in a third-generation mobile communication system.

Figure 2:
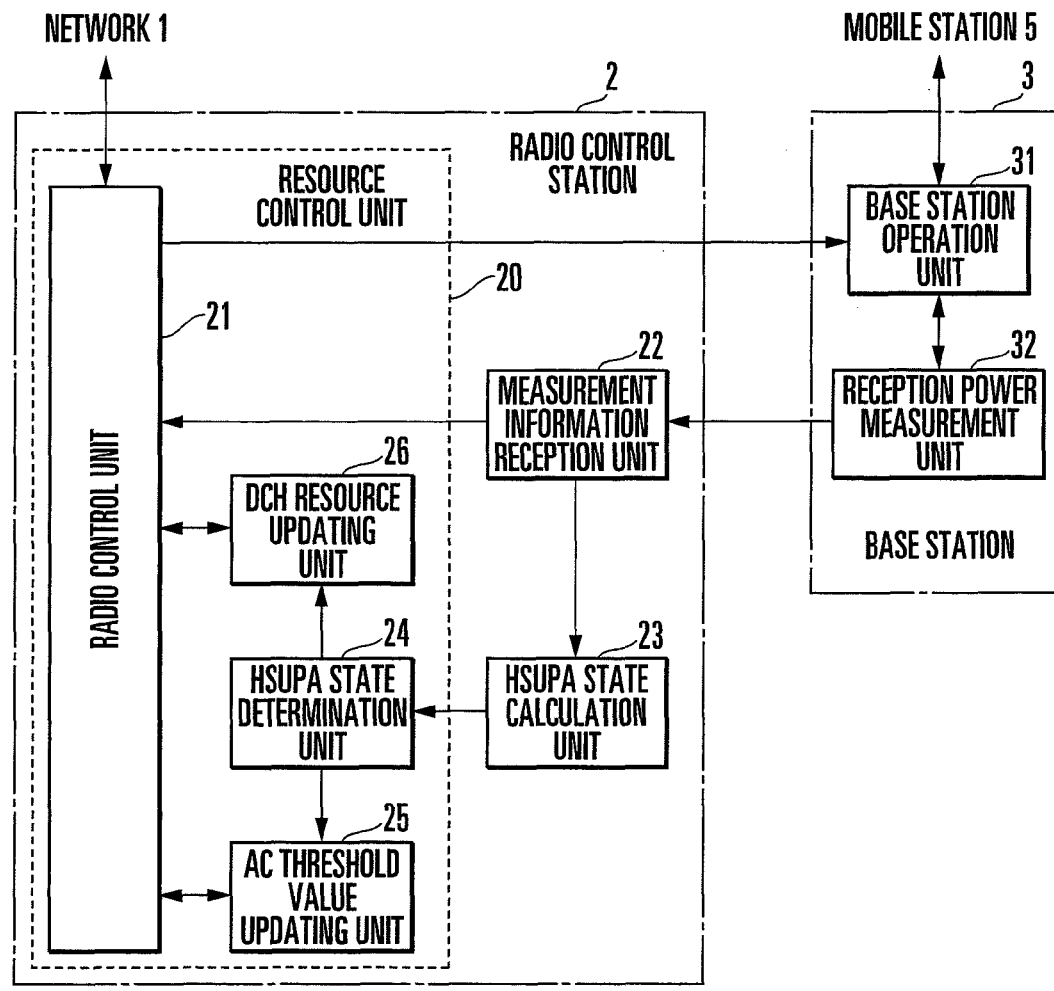
FIG. 2 is a block diagram showing the basic arrangement of the wireless communication system.

Referring to FIG. 2, a radio control station 2 comprises a radio control unit 21, a measurement information reception unit 22, an HSUPA state calculation unit (second resource state calculation unit) 23, an HSUPA state determination unit 24, an AC threshold value updating unit 25, and a DCH resource updating unit (first resource updating unit) 26. A DCH (Dedicated Channel) is a transport channel corresponding to a DPCH serving as a physical channel. Among the above components of the radio control station 2, the radio control unit 21, the HSUPA state determination unit 24, the AC threshold value updating unit 25, and the DCH resource updating unit 26 constitute a resource control unit 20.

The radio control unit 21 has the same function as an RNC (Radio Network Controller) used in the third-generation mobile communication system and is connected to a network 1. The radio control unit 21 exchanges various kinds of control messages with a base station 3 to control radio resources used in wireless communication between the base station and a mobile station 5, and resource use regulation to reject a resource use request (establishment request) from the base station 3. The arrangement and operation of the radio control unit 21 are known to those skilled in the art, and a description thereof will not be repeated.

The measurement information reception unit 22 receives an RTWP and RSEPS (Received Scheduled E-DCH Power Share) reported by a control message from a reception power measurement unit 32 in the base station 3. The measurement information reception unit 22 notifies the radio control unit 21 and the HSUPA state calculation unit 23 of the RTWP and RSEPS. The RSEPS represents a ratio of the RTWP to the total reception power from the mobile station using the HSUPA scheme under the control of the cell forming the base station 3.

Using the RTWP and RSEPS, the HSUPA state calculation unit 23 calculates the use state of a resource usable in the HSUPA scheme. The HSUPA state calculation unit 23 notifies the HSUPA state determination unit 24 of the calculation result.

The HSUPA state determination unit 24 determines the processing contents using the notified use state information and notifies the AC threshold value updating unit 25 or the DCH resource updating unit 26 of the determination result.

The AC threshold value updating unit 25 updates the AC threshold value of the DCH based on the notification from the HSUPA state determination unit 24. The AC threshold value updating unit 25 notifies the radio control unit 21 of the updating result, thereby updating the AC threshold value.

The DCH resource updating unit 26 notifies the radio control unit 21 of the decrease in the DCH transmission rate to a predetermined transmission rate or the release of the DCH resource.

The base station 3 comprises a base station operation unit 31 connected to the mobile station 5 and the reception power measurement unit (resource measurement unit) 32.

The base station operation unit 31 has the same function as a NodeB used in a third-generation mobile communication system. The arrangement and operation of the unit 31 are known to those skilled in the art, and a description thereof will not be repeated.

The reception power measurement unit 32 measures the RTWP and RSEPS and has a measurement interval, an average interval, and a report interval as time counting information. The measurement interval is a time interval during which the RTWP and RSEPS are measured. The average interval is a time interval during which average values of all RTWPs and RSEPSs measured during the measurement interval are obtained. The report interval is a time interval during which the averaged RTWP and RSEPS are reported to the radio control station 2.

The mobile station 5 comprises a well-known radio terminal device such as a third-generation mobile communication terminal. The mobile station 5 comprises the first data transmission unit 51 and the second data transmission unit 52.

A practical example of the first data transmission unit 51 is the DPCH scheme described above. For example, the first data transmission unit 51 employs the first scheduling method of causing the base station 3 not to schedule the first resource for each mobile station 5 and transmitting data using an arbitrary resource upon generation of the transmission data in the mobile station 5. A practical example of the second data transmission unit 52 is the HSUPA scheme described above. For example, the second data transmission unit 52 employs the second scheduling method of causing the base station 3 to schedule the second resource for each mobile station 5 and transmitting data from the mobile station 5 to the base station 3 using a predetermined resource during a predetermined time interval.

A case will be described in which the DPCH scheme for transmitting data using an uplink dedicated channel is used as the first data transmission unit 51 and the HSUPA scheme for transmitting data using a dedicated channel applied to the uplink high-speed packet transmission scheme is used as the second data transmission unit 52.

Operation of Second Exemplary Embodiment

The operation of the wireless communication system according to the second exemplary embodiment will be described with reference to FIGS. 3 to 8.

[HSUPA State Calculation Operation]

Figure 3:
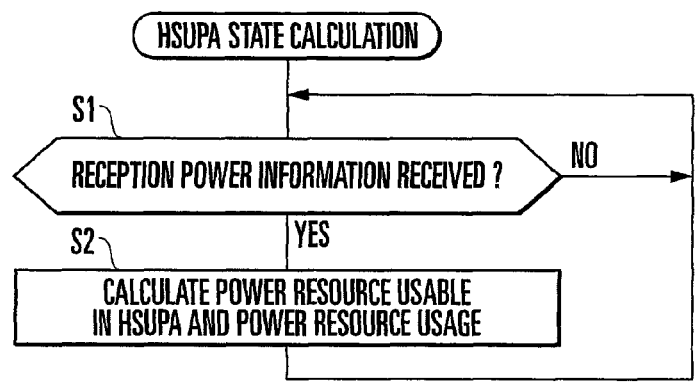
FIG. 3 is a flowchart showing the operation of an HSUPA state calculation unit.

The operation of the HSUPA state calculation unit 23 in the radio control station 2 will be described with reference to FIG. 3.

The HSUPA state calculation unit 23 determines whether the RTWP and RSEPS have been notified from the measurement information reception unit 22 (S1). If YES in step S1, the HSUPA state calculation unit 23 calculates an HSUPA usable power resource amount $P_U$ and power resource usage $U_P$ which represent the use state of a resource usable in the HSUPA scheme (S2). The calculation unit 23 notifies the HSUPA state determination unit 24 of the calculation result.

$P_U$ represents the average power resource which can be assigned to the HSUPA scheme and calculated by equation (3) in which the unit of each term is Watt and the calculation is made using true values:

$$P_U = \text{Target\_RTWP} - \text{RTWP} + P_{S\text{-}HSUPA} \qquad (3)$$

where Target RTWP is the target RTWP used in the HSUPA scheduler in the base station, RTWP is the RTWP reported from the base station, and $P_{S\text{-}HSUPA}$ is the total reception power from the mobile station using the HSUPA scheme under the control of a calculation target cell and calculated by (RSEPS×RTWP) using the reported RTWP and RSEPS. The scheduler distributes the resources between the mobile stations so that the RTWP as the total use resource is equal to or less than the target RTWP. The radio control station 2 notifies the base station 3 of the Target TRWP. S in S-HSUPA represents a Serving Cell and provides data to the mobile station using the controlled HSUPA.

$U_P$ represents a ratio of the actually used power resource to the resource usable in the HSUPA scheme and is calculated by equation (4) in which the calculation is made using the true values (Watt) and the previous calculated $U_P$ is used for $P_U=0$:

$$U_P = \frac{P_{S\text{-}HSUPA}}{P_U} \qquad (4)$$

Figure 4:
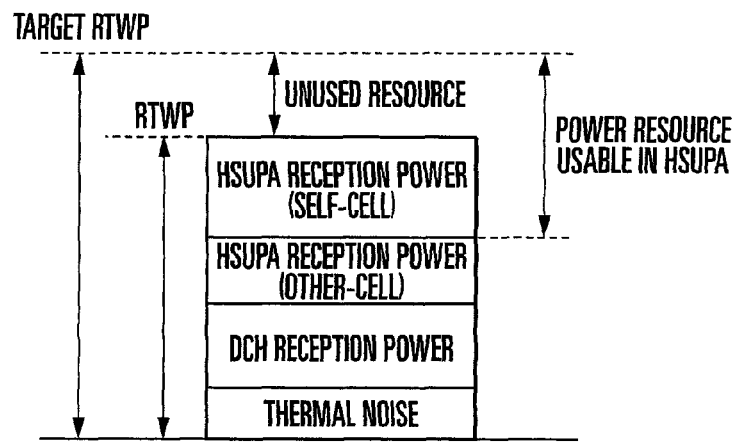
FIG. 4 is a view showing an example of the contents of an uplink channel radio resource.

The contents of the uplink channel radio resources are exemplified as shown in FIG. 4. The RTWP has the self-cell HSUPA reception power, other-cell HSUPA reception power, DCH reception power, and thermal noise. The self-cell HSUPA reception power represents the total reception power from the mobile station which uses the HSUPA scheme and whose self-cell serves as the Serving Cell. The self-cell HSUPA corresponds to $P_{S\text{-}HSUPA}$. The other-cell HSUPA reception power represents the total reception power of the mobile station which uses the HSUPA scheme and corresponds to the other-cell adjacent to the self-cell and serving as the Serving Cell. The DCH reception power represents the total reception power from the mobile station whose self- and other-cells use the DCH. The HSUPA usable power resource has the relationship shown in FIG. 4 with these reception powers in accordance with equation (3). The resource obtained by subtracting the RTWP from the Target RTWP is defined as an unused resource, which has the relationship shown in FIG. 4.

Figure 5:
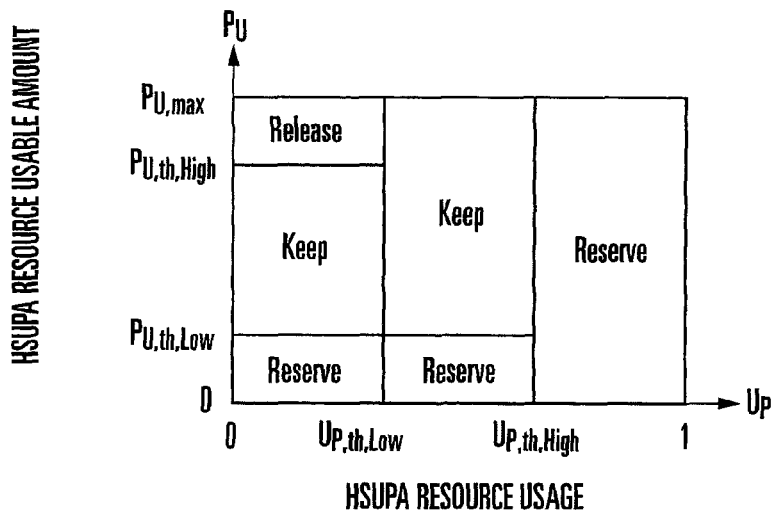
FIG. 5 is a view showing a power resource use state in the HSUPA scheme in accordance with $P_U$ and $U_P$.

The power resource usable in the HSUPA scheme and corresponding to the $P_U$ and $U_P$ is usable, as shown in FIG. 5 and held in the HSUPA state determination unit 24. Three power resource use states will be defined. The first state is a Reserve state which represents that the power resource usable in the HSUPA scheme is short and an additional power source must be ensured. The second state is a Release state which represents that the power resource usable in the HSUPA scheme is excessive and the power resource is to be released. The third state is a Keep state which represents that the power resource usable in the HSUPA scheme is just enough and the power resource is neither ensured nor released. Plotting $P_U$ along the ordinate and $U_P$ along the abscissa, two threshold values $P_{U,th,High}$ and $P_{U,th,Low}$ ($P_{U,th,High} > P_{U,th,Low}$) are set for $P_U$, and two threshold values $U_{P,th,High}$ and $U_{P,th,Low}$ ($U_{P,th,High} > U_{P,th,Low}$) are set for $U_P$, as shown in FIG. 5.

A maximum value $P_{U,max}$ of $P_U$ is equal to (Target RTWP−thermal noise) judging from the relationship in FIG. 4. The maximum value of $U_P$ is defined as 1. The Reserve, Release, and Keep states are defined as shown in FIG. 5 for setting the $P_U$ and $U_P$ threshold values. When $P_U$ is smaller than the lower limit threshold value $P_{U,th,Low}$, the power resource is short, and the Reserve state is set. When $U_P$ is larger than the upper limit threshold value $U_{P,th,High}$, an additional power resource is ensured, and the Reserve state is set. When $P_U$ is larger than the upper limit threshold value $P_{U,th,High}$ and $U_P$ is smaller than the lower limit threshold value $U_{P,th,Low}$, a large amount of resource ensured is rarely used, and the Release state is set. In other cases, since the power resource is just enough, and the Keep state is set. Two threshold values are set for each of $P_U$ and $U_P$. However, the number of threshold values is not limited to two.

[HSUPA State Determination Operation]

The operation of the HSUPA state determination unit 24 will be described with reference to FIG. 6.

The HSUPA state determination unit 24 acquires $P_U$ and $U_P$ notified from the HSUPA state calculation unit 23 (S11). The determination unit 24 determines whether $U_P < U_{P,th,High}$ holds (S12). If NO in step S12, the unit 24 determines state=Reserve (S13). If YES in step S13, the HSUPA state determination unit 24 notifies the AC threshold value updating unit 25 and the DCH resource updating unit 26 of the determination result (S14). If $U_P < U_{P,th,High}$ holds, the unit 24 further determines whether $P_U < P_{U,th,Low}$ holds (S15). If YES in step S15, the same notification as in state=Reserve is made.

If $P_U < P_{U,th,Low}$ does not hold, the unit 24 further determines whether $U_P < U_{P,th,Low}$ and $P_U > P_{U,th,High}$ holds (S16). If YES in step S16, the unit 24 determines state=Release (S17). If YES in step S17, the unit 24 notifies the AC threshold value updating unit 25 of the determination result (S18). If NO in step S17, the unit 24 determines state=Keep (S19). If YES in step S19, no determination result is notified.

The series of operations described above are performed every time the RTWP and RSEPS are reported from the base station in a preset report cycle. When the Reserve or Release state is continuously determined, the Reserve or Release operation must be repeated until the Keep state is determined.

[AC Threshold Value Updating Operation]

Figure 7:
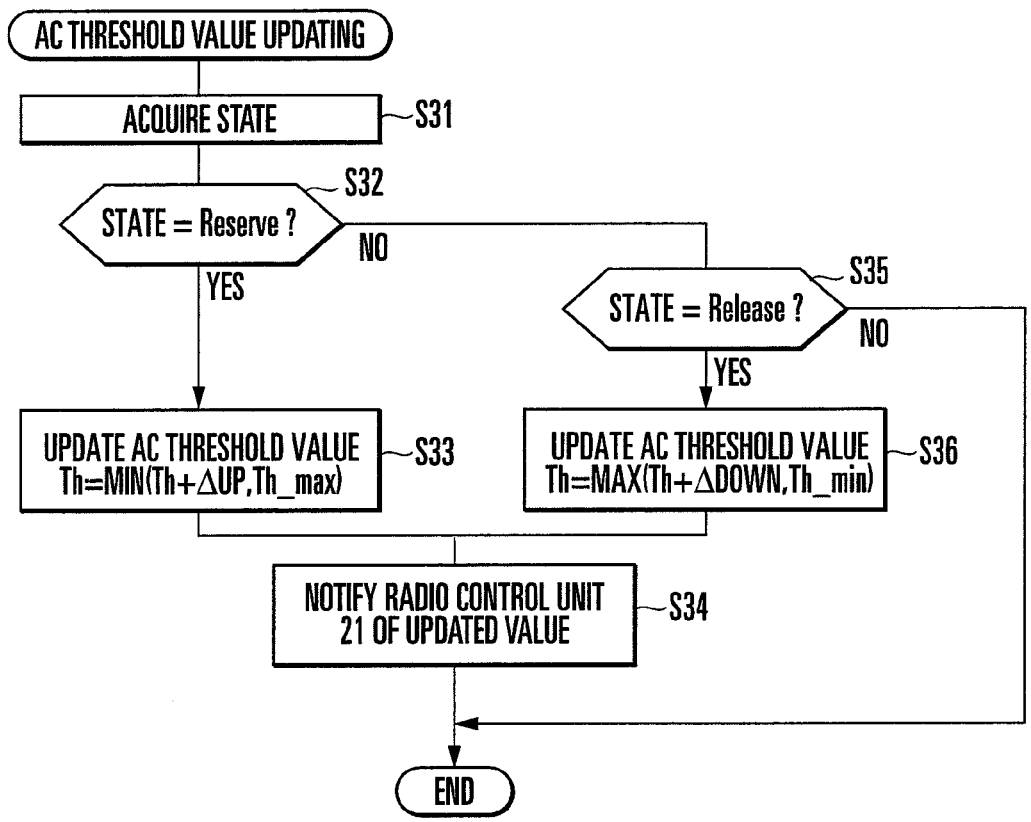
FIG. 7 is a flowchart showing an operation of an AC threshold value updating unit.

The operation of the AC threshold value updating unit 25 will be described with reference to FIG. 7.

The AC threshold value updating unit 25 acquires the Reserve or Release state notified from the HSUPA state determination unit 24 (S31). The unit 25 then determines whether the state is the Release state (S32). If YES in step S32, the unit 25 updates a DCH AC threshold value Th to a smaller one of a value obtained by increasing the current value by a step width $\Delta U_P$ and the maximum value Th_max of the AC threshold value (S33). The unit 25 notifies the radio control unit 21 of the updated AC threshold value (S34). If NO in step S32, the unit 25 determines whether the state is the Reserve state (S35). If YES in step S35, the unit 25 updates the DCH AC threshold value Th to a larger one of a value obtained by subtracting the current value by a step width $\Delta$DOWN and a minimum value Th_min of the AC threshold value (S36). The unit 25 notifies the radio control unit 21 of the updated AC threshold value (S34).

[DCH Resource Updating Operation]

The operation of the DCH resource updating unit 26 will be described with reference to FIG. 8. The unit 26 acquires the state (=Reserve) notified from the HSUPA state determination unit 24 (S41). The unit 26 then establishes a DCH in a state notification source cell and determines whether the mobile station during transmission of packet data exists (S42). If YES in step S42, the unit 26 further determines whether the mobile station transmits the packet data at an unsettable minimum rate (S44). All these determinations are done by communicating with the radio control unit 21. If mobile stations transmitting packet data at not the minimum rate exist, mobile stations are selected in descending order of the transmission rate up to a preset maximum value N1. The unit 26 switches the rates of the selected mobile stations to the minimum rate (S44). The unit 26 notifies the radio control unit 21 of the updated rate.

Effects of Second Exemplary Embodiment

As described above, this exemplary embodiment comprises the first data transmission unit 51 which transmits data from the mobile station to the base station using the first resource assigned based on the first scheduling method and the second data transmission unit 52 which transmits data from the mobile station to the base station using the second resource which is not used in the first data transmission unit 51 and which is assigned based on the second scheduling method. The resource control unit 20 of the radio control station instructs the use regulation of the first resource in accordance with the second resource amount assigned as the second resource and the second resource usage representing the ratio of the resource used in the second data transmission unit 52 to all the second resource amount.

More specifically, the base station 3 comprises the reception power measurement unit 32 which measures the RTWP representing the reception power of all channels and the RSEPS (Received Scheduled E-DCH Power Share) representing the ratio of the RTWP to the reception power of the HSUPA scheme and notifies the radio control station of the measurement values. The radio control station 2 comprises the HSUPA state calculation unit 23 which measures the power resource usable in the HSUPA scheme and the usable power resource usage in accordance with the RTWP and RSEPS, the HSUPA state determination unit 24 which determines the regulation of the use of uplink dedicated channel in accordance with the usable power resource usage, and the AC threshold value updating unit 25 and the DCH resource updating unit 26 which regulate the use of the uplink dedicated channel. When the usable power resource is smaller than the predetermined power resource threshold value or the usage is larger than the predetermined usage threshold value, the AC threshold value of the uplink dedicated channel is decreased and the transmission rate is lowered.

Assume that the use resource amount (first resource) of the DHC scheme (first data transmission unit 51) is large, that the use resource amount (second resource) of the HSUPA scheme (second data transmission unit 52) is small, and that the power resource usable in the HSUPA scheme is short. In this case, the use of the use resource (first resource) in the DCH scheme is regulated, and the resource (second resource) in the HSUPA scheme is increased. For this reason, the throughput of the HSUPA scheme can increase. Even if independent wireless communication schemes are used in a maxed manner, the decrease in throughput localized to either scheme can be prevented.

Third Exemplary Embodiment

A wireless communication system according to the third exemplary embodiment will be described with reference to FIG. 9.

Figure 8:
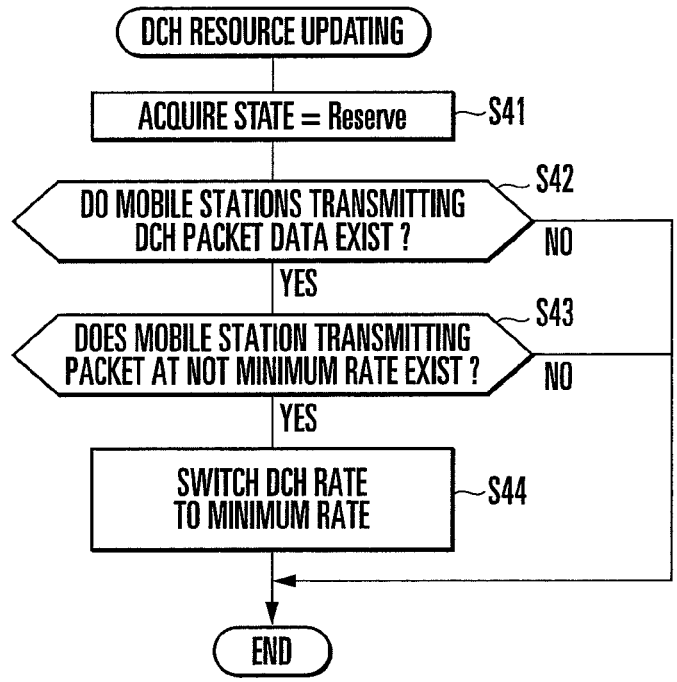
FIG. 8 is a flowchart showing an operation of a DCH resource updating unit.
Figure 9:
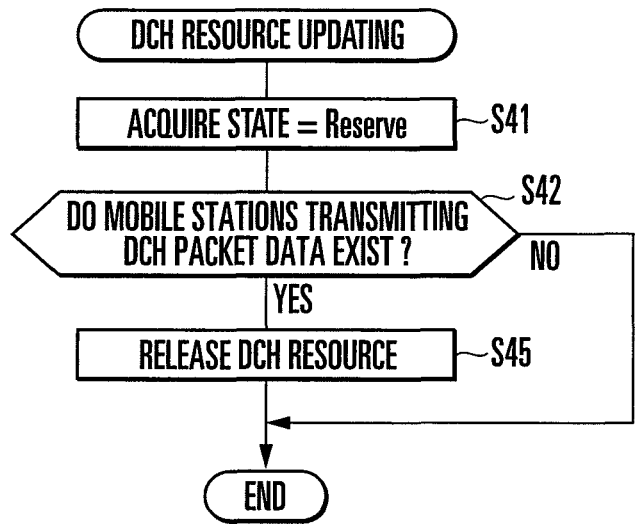
FIG. 9 is a flowchart showing another operation of the DCH resource updating unit.

The third exemplary embodiment is different from the second exemplary embodiment in that the flowchart in FIG. 9 replaces the flowchart in FIG. 8. Referring to FIG. 9, the operation according to the third exemplary embodiment is different from that according to the second exemplary embodiment in that step 45 replaces steps S43 and S44 in FIG. 8. The remaining arrangement in the wireless communication system is the same as in FIGS. 1 and 2, and a detailed description will not be repeated.

In the third exemplary embodiment, when establishing the DCH in the state notification source cell and mobile stations during transmission of packet data exist, a DCH resource updating unit 26 selects mobile stations in descending order of transmission rate up to a preset maximum value N2 and releases the DCH resources of the selected mobile stations (S45). The unit 26 notifies a radio control unit 21 of the updated resource. Note that when mobile stations simultaneously join the speech service, these mobile stations are excluded from the above selection.

Effects of Third Exemplary Embodiment

In the third exemplary embodiment, the power resource of the uplink dedicated channel is released in place of the decrease in transmission rate of the uplink dedicated channel. The size of a resource released from one mobile station is larger than that in the second exemplary embodiment. Therefore, the power resource usable in the HSUPA scheme can increase with a smaller number of regulated mobile stations than that in the second exemplary embodiment.

Fourth Exemplary Embodiment

A wireless communication system according to the fourth exemplary embodiment of the present invention will be described with reference to FIGS. 10 and 11.

Figure 6:
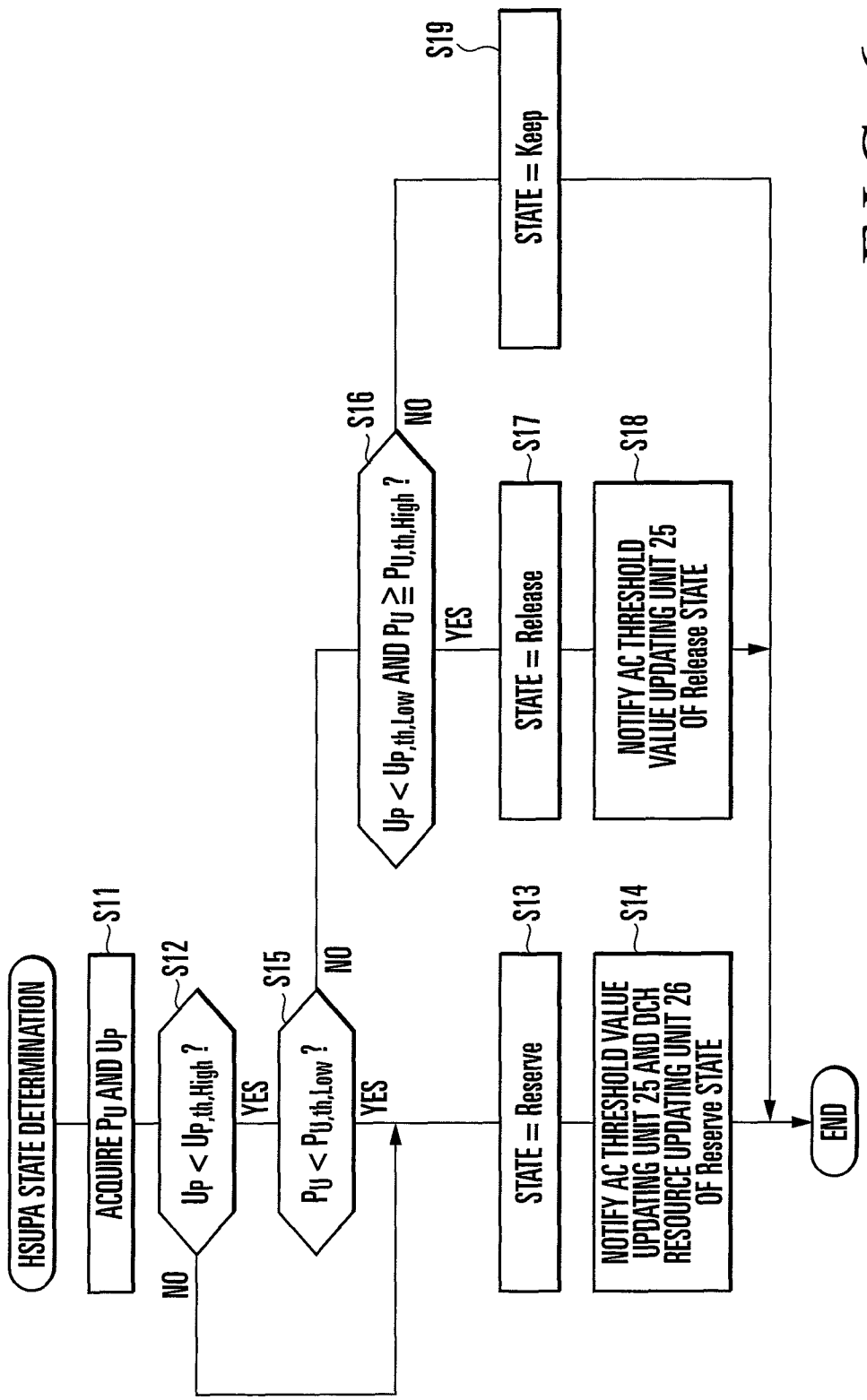
FIG. 6 is a flowchart showing the operation of an HSUPA state determination unit.
Figure 10:
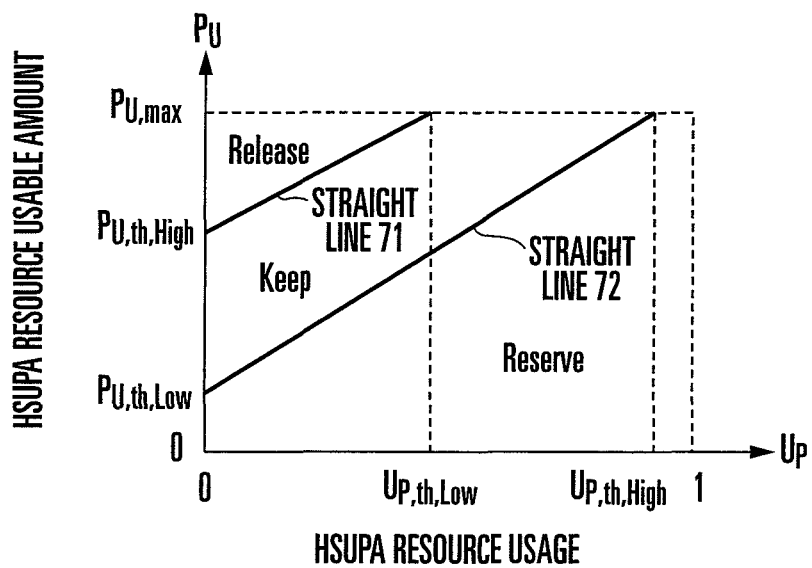
FIG. 10 is a view showing another power resource use state in the HSUPA scheme in accordance with $P_U$ and $U_P$.
Figure 11:
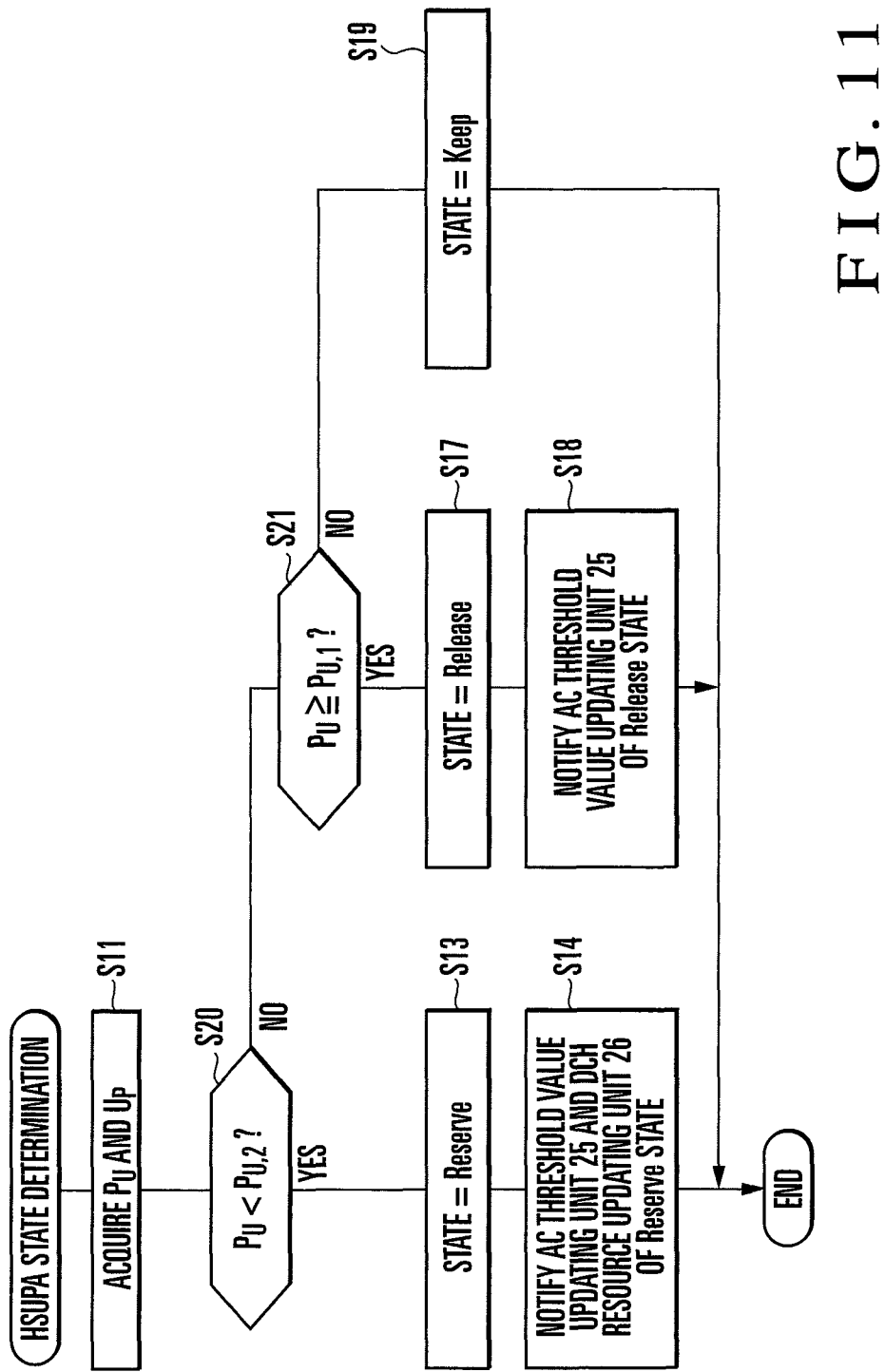
FIG. 11 is a flowchart showing still another operation of the HSUPA state determination unit.

The fourth exemplary embodiment is different from the second exemplary embodiment in that the graph in FIG. 10 replaces that in FIG. 5 and the flowchart in FIG. 11 replaces that in FIG. 6. The remaining arrangement of the wireless communication system is the same as in FIGS. 1 and 2, and a detailed description thereof will not be repeated.

An HSUPA state determination unit (lower limit value calculation unit) 24 holds the use states of the power resources usable in the HSUPA scheme, which correspond to $P_U$ and $U_P$, as shown in FIG. 10. The power resource use states comprise three states, Reserve, Release, and Keep states as in FIG. 5. In a graph in which $P_U$ is plotted along the ordinate, and $U_P$ is plotted along the abscissa, a straight line 71 passing through two points (0, $P_{U,th,High}$) and ($U_{P,th,Low}$, $P_{U,max}$) and a straight line 72 passing through two points (0, $P_{U,th,Low}$) and ($U_{P,th,High}$, $P_{U,max}$) are set, as shown in FIG. 9. $P_{U,th,Low}$ and $P_{U,th,High}$ are respectively set as the lower and higher limit values of the power resources to be ensured when $U_P$ is very small. $U_{P,th,Low}$ and $U_{P,th,High}$ are respectively set as the lower and higher limit values of the power resources to be used when $P_U$ is close to $P_{U,max}$.

Using the coordinates of the two points, the straight line 71 is defined as $P_U = ((P_{U,max} - P_{U,th,High})/U_{P,th,Low}) \times U_P + P_{U,th,High}$, and the straight line 72 is defined as $P_U = ((P_{U,max} - P_{U,th,Low})/U_{P,th,High}) \times U_P + P_{U,th,Low}$. The Reserve, Release, and Keep states are defined as shown in FIG. 10. In this graph, a region below the straight line 72 is defined as the Reserve state in which the power resource is short. A region above the straight line 72 is defined as the Release state in which a large amount of power resource ensured is rarely used. The remaining region is defined as the Keep state. Note that the straight lines are kept constant until $P_U$ reaches the maximum value. However, the slopes of the straight lines may change midway. In this case, the coordinates of a point at which the slope changes must be set.

[HSUPA State Determination Operation]

The operation of the HSUPA state determination unit 24 will be described with reference to FIG. 11.

Referring to FIG. 11, the operation of the fourth exemplary embodiment of the present invention is different from that of the second exemplary embodiment in that step S12 in FIG. 6 is omitted, and steps S20 and S21 replace steps S15 and S16.

More specifically, the HSUPA state determination unit 24 calculates the $P_U$ values on the straight lines 71 and 72 and defines the calculated values as $P_{U,1}$ and $P_{U,2}$. Note that $P_{U,1}$ and $P_{U,2}$ have $P_{U,max}$ as the maximum value. The unit 24 determines whether $P_U < P_{U,2}$ holds for the notified $P_U$(S20).

If YES in step S20, the unit 24 determines the Reserve state and notifies the determination result. If NO in step S20, the unit 24 further determines whether $P_U \geq P_{U,1}$ (S21). If YES in step S21, the unit 21 determines the Release state and notifies the determination result. Otherwise, the unit 24 determines the Keep state.

Effects of Fourth Exemplary Embodiment

As described above, according to this exemplary embodiment, the HSUPA state determination unit 24 calculates the lower limit value of the usable power resource which monotonically increases with an increase in usage. When the usable power resource is smaller than the lower limit value, the unit 24 decreases the AC threshold value of the uplink dedicated channel and the transmission rate.

The power resource usable in the HSUPA scheme can be smoothly changed depending on its usage. The fourth exemplary embodiment has a better effect of reducing an opportunity of wastefully ensuring the power resource usable in the HSUPA scheme than the second exemplary embodiment.

Fifth Exemplary Embodiment

A wireless communication system according to the fifth exemplary embodiment of the present invention will be described below.

The fifth exemplary embodiment is different from the fourth exemplary embodiment in that the flowchart in FIG. 9 replaces the flowchart in FIG. 8 as to the operation of the DCH resource updating unit 26 of the fourth exemplary embodiment. That is, the difference between the fifth and fourth exemplary embodiments is the same as that between the third and second exemplary embodiments, thereby obtaining the effects of the third and fourth exemplary embodiments.

Sixth Exemplary Embodiment

A wireless communication system according to the sixth exemplary embodiment of the present invention will be described with reference to FIGS. 12 and 13.

Figure 12:
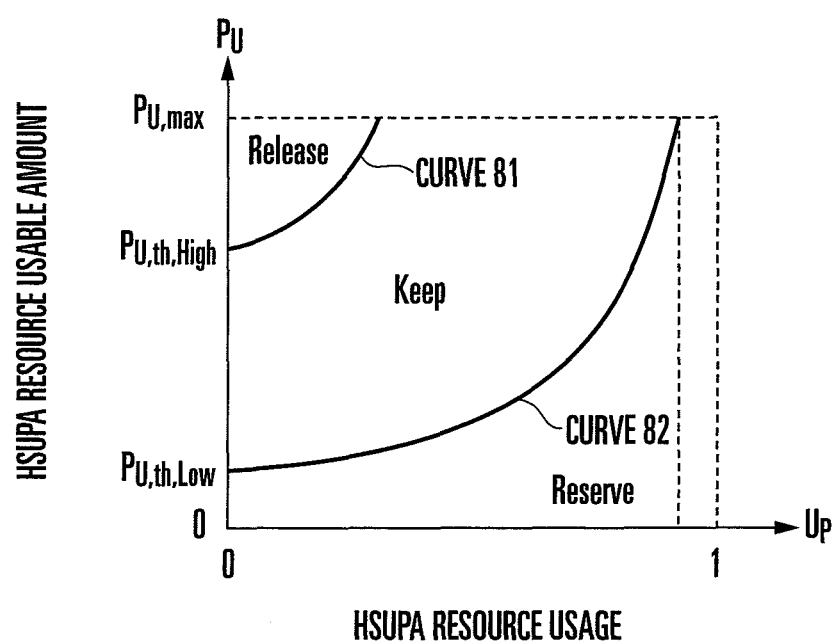
FIG. 12 is a view showing still another power resource use state in the HSUPA scheme in accordance with $P_U$ and $U_P$.
Figure 13:
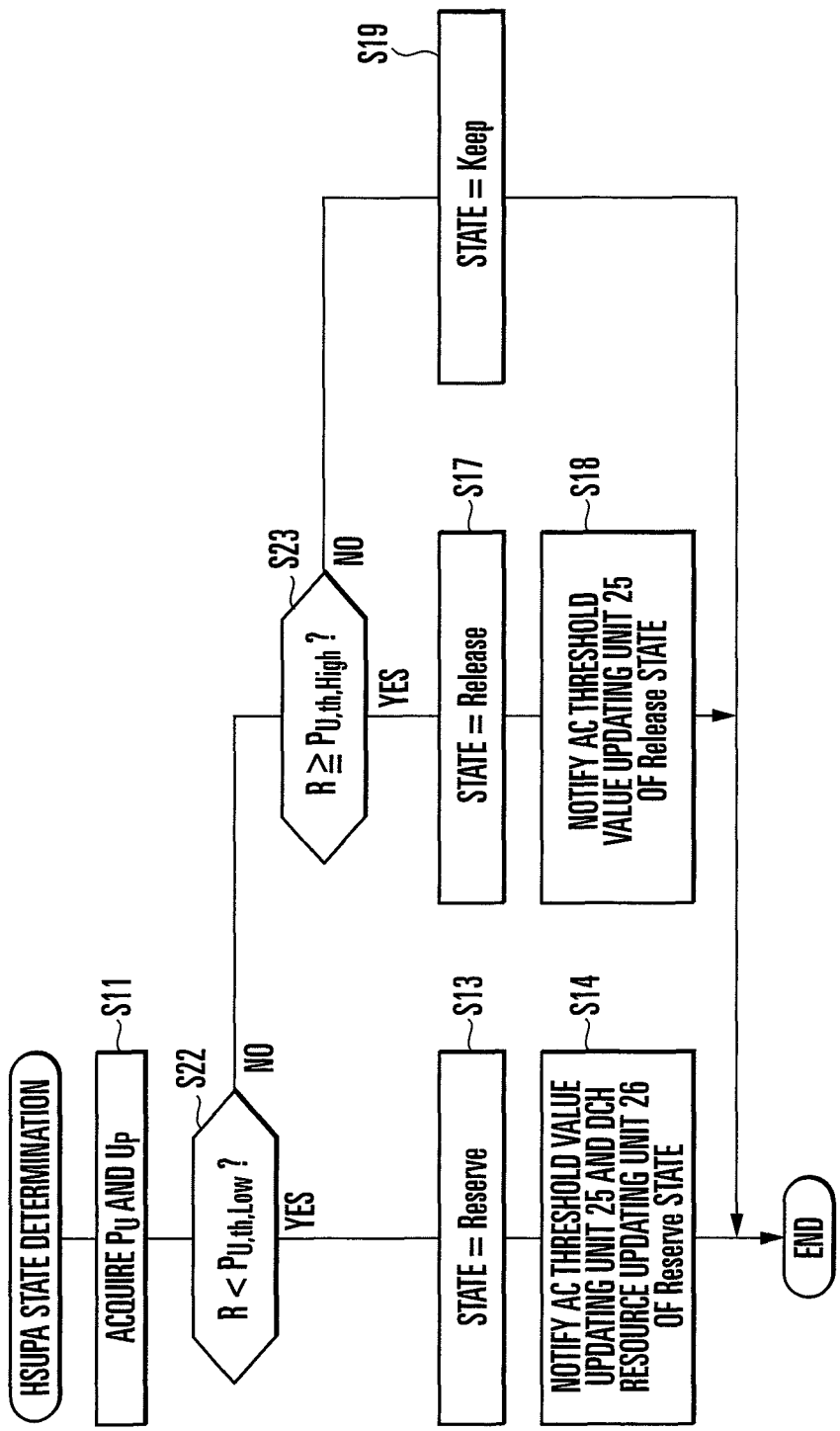
FIG. 13 is a flowchart showing still another operation of the HSUPA state determination unit.

The sixth exemplary embodiment is different from the second exemplary embodiment in that a graph in FIG. 12 replaces that in FIG. 5, and a flowchart in FIG. 13 replaces that in FIG. 6.

An HSUPA state determination unit (unused resource calculation unit) 24 holds the use states of the power resources usable in the USUPA scheme in accordance with $P_U$ and $U_P$, as shown in FIG. 12. As the power resource states, three states, Reserve, Release, and Keep states are defined, as in FIG. 5. In a graph obtained by plotting $P_U$ along the ordinate and $U_P$ along the abscissa, equation (5) is defined by:

$$P_U \times (1-U_P) = \text{Target\_RTWP} - \text{RTWP} \tag{5}$$

Equation (5) can be derived from equations (3) and (4) which define $P_U$ and $U_P$ in the second exemplary embodiment. The left-hand side of equation (5) represents the unused portion of the power resource usable in the HSUPA scheme and corresponds to the unused resource in FIG. 4. The right-hand side represents an amount obtained by subtracting an RTWP report value from the target RTWP and corresponds to the unused resource in FIG. 4. Curves 81 and 82 having threshold values $P_{U,th,High}$ and $P_{U,th,Low}$ ($P_{U,th,High} > P_{U,th,Low}$) and defined by $P_U = P_{U,th,High}/(1-U_P)$ and $P_U = P_{U,th,Low}/(1-U_P)$, respectively, are set. The Reserve, Release, and Keep states are defined as shown in FIG. 12. In the graph, a region below the curve 82 is defined as the Reserve state in which the power resource is short. A region above the curve 81 is defined as the Release state in which a large amount of power resources ensured is rarely used. The remaining region is defined as the Keep state. The two curves are used to define the regions in FIG. 12, but the number of curves is not limited to two.

[HSUPA State Determination Operation]

The operation of the HSUPA state determination unit 24 will be described with reference to FIG. 13.

Referring to FIG. 13, the operation of the sixth exemplary embodiment of the present invention is different from that of the second exemplary embodiment in that step S12 in FIG. 6 is omitted and steps 22 and 23 replace steps S15 and S16.

More specifically, the HSUPA state determination unit 24 calculates an unused resource value R by the left-hand side of equation (5), i.e., $P_U \times (1-U_P)$ using the notified $P_U$ and $U_P$. The unit 24 determines whether $R < P_{U,th,Low}$ holds (S22). If YES in step S22, the unit 24 determines the Reserve state and notifies the determination result; otherwise, the unit 24 further determines $R > P_{U,th,High}$ holds (S23). If YES in step S23, the unit 24 determines the Release state and notifies the determination result; otherwise, the unit 24 determines the Keep state.

Effects of Sixth Exemplary Embodiment

As described above, according to this exemplary embodiment, the HSUPA state determination unit 24 calculates the unused resource in accordance with the usable power resource and usage. If the unused resource is smaller than the predetermined resource threshold value, the AC threshold value of the uplink dedicated channel is decreased, and the transmission rate is also decreased.

This makes it possible to keep the unused resource within a predetermined range. The sixth exemplary embodiment has a better effect of reducing an opportunity of wastefully ensuring the power resource usable in the HSUPA scheme and efficiently regulating the DCH use than the second and fourth exemplary embodiments.

Seventh Exemplary Embodiment

A wireless communication system according to the seventh exemplary embodiment of the present invention will be described below.

The seventh exemplary embodiment is different from the sixth exemplary embodiment in that a flowchart in FIG. 9 replaces that in FIG. 8 as to the operation of the DCH resource updating unit 26 in the sixth exemplary embodiment. That is, the difference between the seventh and sixth exemplary embodiments is the same as that between the third and second exemplary embodiments, thereby obtaining the effects of the third and sixth exemplary embodiments.

Extension of Exemplary Embodiments

In each exemplary embodiment described above, a new cell load estimated when the radio control unit (regulation unit) of the radio control station 2 or a new functional unit (regulation unit) establishes an uplink radio channel used in the DPCH is calculated using inequality (2). When the cell load is equal to or more than a predetermined threshold value, an instruction for regulating establishment of the uplink radio channel used in the DPCH may be output. In this case, by decreasing the above threshold value, the use of the DPCH resource may be regulated.

Each exemplary embodiment described above is applicable not only to the HSUPA scheme, but also an LTE (Long Term Evolution) network examined in the 3GPP (3rd Generation Partnership Project) as a mobile communication system standardization organization. Although not illustrated, the LTE network comprises an eNodeB serving as a base station having a radio control station function. The eNodeB connects the network and mobile stations.

In each exemplary embodiment described above, the reception power of the base station 3 is defined as the radio resource. However, any other resource such as a radio frequency band used in the base station may be used.

In the above LTE network, a radio resource in the form of a frequency band is divided into RBs (Resource Blocks), each RB is assigned to a mobile station for each predetermined time unit TTI (Transmission Time Interval), and a large number of mobile stations can perform speech communications and packet communications for each cell.

The present invention is also applicable to the following example, In speech communications, Long-lived Scheduling for semipermanently, regularly assigning the RB is used as the first scheduling method. In packet communications, Short-lived Scheduling for dynamically assigning the RB for each TTI is used as the second scheduling method.

First Example

The first example of the wireless communication system according to the second exemplary embodiment of the present invention will be described below.

An operation example in FIG. 3 will be described below. Assume that RTWP=−97 dBm and RSEPS=0.1 are received as the report values from a reception power measurement unit 32 using Target RTWP=−96 dBm as a parameter. In this case, an HSUPA state calculation unit 23 calculates $P_U$ and $U_P$ using equations (6) and (7) since PS-HSUPA=RSEPS× RTWP=−107 dBm is given. The calculations are made using true values (Watt). The unit 23 notifies an HSUPA state determination unit 24 of the calculation result.

$$P_U = \text{Target\_RTWP} - RTWP + P_{S\_HSUPA} \quad (6)$$
$$= (-96 \text{ dBm}) - (-97 \text{ dBm}) + (-107 \text{ dBm})$$
$$= -101.4 \text{ dBm}$$

$$U_P = \frac{P_{S\_HSUPA}}{P_U} = \frac{(-107 \text{ dBm})}{(101.4 \text{ dBm})} = 0.28 \quad (7)$$

The operation examples in FIGS. 5 and 6 will be described below. Assume that the HSUPA state determination unit 24 determines that $P_{U,th,High}$=−98 dBm, $P_{U,th,Low}$=−100 dBm, $U_{P,th,High}$=0.8, and $U_{P,th,Low}$=0.2 are set. Since $P_U$=−101.4 dBm<$P_{U,th,Low}$ and $U_{P,th,Low}$<$U_P$=0.28<$U_{P,th,High}$ hold, the unit 24 determines that the use state of the power resource usable in the HSUPA scheme is the Reserve state. The unit 24 notifies an AC threshold value updating unit 25 and a DCH resource updating unit 26 of this determination result.

The operation example in FIG. 7 will be described below. Assume that the current DCH AC threshold value is Th=0.60. Assume also that ΔDOWN=0.05 and Th_min=0.40 are set. In this case, the AC threshold value updating unit 25 receives the Reserve state and executes processing for decreasing the AC threshold value. Since ΔDOWN=0.05 is subtracted from the current AC threshold value Th=0.60, the difference is not less than Th_min=0.40. The AC threshold value Th is updated to 0.55=0.60−0.05. A radio control unit 21 is notified of the updated result.

An operation example in FIG. 8 will be described below. Assume that three users A, B, and C who are transmitting the DCH packets exist, and the transmission rates are 64 kbps, 32 kbps, and 128 kbps. Assume also that the minimum rate=32 kbps and N1=1 are set as parameters. The DCH resource updating unit 26 selects the user C having the transmission rate of 128 kbps and instructs the radio control unit 21 to switch the transmission rate to the minimum rate of 32 kbps for the selected user C.

Second Example

The second example of the wireless communication system according to the sixth exemplary embodiment will be described below.

An operation example in FIGS. 12 and 13 will be described below. An HSUPA state determination unit 24 determines that $P_{U,th,High}$=−98 dBm and $P_{U,th,Low}$=−102 dBm are set as the threshold values. The value of $P_{U,th,Low}$ is set smaller than that of Example 1 so that $P_{U,th,Low}$ becomes small when $U_P$ is small. Assume also that an HSUPA state calculation unit 23 has notified $P_U$=−101 dBm and $U_P$=0.10. In this case, R=$P_U$× (1−$U_P$)=(−101 dBm)×(1−0.1)=−101.5 dBm is calculated, so that $P_{U,th,Low}$<R=−101.5 dBm<$P_{U,th,High}$ holds. The unit 24 determines that the use state of the power resource usable in the HSUPA scheme is the Keep state.

In the operation of FIG. 5 in Example 1, similar report values in the setting of Example 1 allow to determine the Reserve state. Since $U_P$ is as very small as $U_P$=0.10, the HSUPA resource need not be ensured in practice. Therefore, the state is desirably determined as the Keep state as in Example 2. Example 2 operates more effectively than Example 1.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A wireless communication control method comprising the steps of:
    transmitting data from a mobile station to a base station using a first resource assigned based on a first scheduling method;
    transmitting data from the mobile station to the base station using a second resource which is assigned based on a second scheduling method and is not used in the step of transmitting using the first resource; and
    controlling resources including the first and second resources, in which a radio control station controls use of the resources in wireless communication in the base station by instructing the base station to regulate use of the first resource in accordance with a second resource amount (Pu) available as the second resource out of an entire amount of the resources of the base station and with a second resource usage (Up) as a ratio of an amount of the resources used in the step of transmitting using the second resource versus the second resource amount,
    wherein said step of controlling the resources comprises the steps of:
    calculating an unused amount of the resources at the base station by subtracting an in-use amount of the resources at said base station reported therefrom from a target value of the resources at the base station notified thereto in advance;

calculating a total reception power from the mobile station that transmits the data to the base station in the above second-recited step of transmitting under the control of a cell forming the base station, by multiplying, by the in-use amount of the resources, a ratio received scheduled enhanced dedicated channel (E-DCH) power share, reported from the base station, of the amount of the resources used in the step of transmitting using the second resource versus the in-use amount of the resources;

calculating an amount of the resources available as the second resource out of the entire amount of the resources of the base station by adding the total reception power to the unused amount of the resources; and calculating the second resource usage by dividing the total reception power by the amount of the resources available as the second resource.

2. A method according to claim 1, wherein the resource comprises a base station reception power.

3. A method according to claim 1, wherein the first scheduling method comprises a method of causing the base station to disable scheduling of the first resource for the mobile station.

4. A method according to claim 1, wherein the step of transmitting using the first resource comprises the step of transmitting data using an uplink dedicated channel as a radio channel from the mobile station to the base station.

5. A method according to claim 1, wherein the second scheduling method comprises a method of causing the base station to perform scheduling of the second resource for the mobile station.

6. A method according to claim 1, wherein the step of transmitting using the second resource comprises the step of transmitting data using an uplink dedicated channel used in an uplink high-speed packet transmission scheme as a radio channel from the mobile station to the base station.

7. A method according to claim 1, further comprising the step of causing the base station to measure resources of all channels and a resource of an uplink radio channel used in the step of transmitting using the second resource and to notify the radio control station of measurement values.

8. A method according to claim 1, further comprising the step of causing the radio control station to calculate the second resource amount and the second resource usage in accordance with resources of all channels and a resource of an uplink radio channel used in the step of transmitting using the second resource.

9. A method according to claim 1, wherein the step of instructing comprises the steps of: instructing establishment regulation of an uplink radio channel used in the step of transmitting using the first resource when a new cell load estimated when the uplink radio channel used in the step of transmitting using the first resource is established is not less than a predetermined threshold value; and regulating use of the first resource by decreasing the predetermined threshold value.

10. A method according to claim 1, wherein the step of instructing comprises the step of instructing the base station to decrease a transmission rate of an uplink radio channel used in the step of transmitting using the first resource when regulating use of the first resource.

11. A method according to claim 1, wherein the step of instructing comprises the step of instructing the base station to release a resource of an uplink radio channel used in the step of transmitting using the first resource when regulating use of the first resource.

12. A method according to claim 1, wherein the step of instructing comprises the step of instructing the base station to regulate use of the first resource in at least one of a case in which the second resource amount is smaller than a predetermined resource threshold value and a case in which the second resource usage is larger than a predetermined usage threshold value.

13. A method according to claim 1, further comprising the step of causing the radio control station to calculate a lower limit value of the second resource amount which monotonically increases with an increase in the second resource usage, wherein the step of instructing comprises the step of instructing the base station to regulate use of the first resource when the second resource amount is smaller than the lower limit value.

14. A method according to claim 1, further comprising the step of causing the radio control station to calculate an unused resource from the second resource amount and the second resource usage, wherein the step of instructing comprises the step of instructing the base station to regulate use of the first resource when the unused resource is smaller than a predetermined resource threshold value.

15. A method according to claim 1, wherein the resource comprises a frequency band.

16. A method according to claim 1, wherein the first scheduling method comprises a method of scheduling to allow the mobile station to use the first resource at a predetermined transmission timing.

17. A method according to claim 1, wherein the second scheduling method comprises a method of dynamically assigning the second resource between a plurality of mobile stations for each minimum transmission time unit.

18. A wireless communication system comprising:
a plurality of mobile stations;
a base station which performs wireless communication with a mobile station in a cell using a resource assigned based on a predetermined scheduling method; and
a radio control station which controls use of the resource in wireless communication for said base station,
said mobile station comprising
a first data transmission unit which transmits data to said base station using a first resource assigned based on a first scheduling method and
a second data transmission unit which transmits data to said base station using a second resource which is assigned based on a second scheduling method and is not used in said first data transmission unit, and
said radio control station comprising a resource control unit which instructs said base station to regulate use of the first resource in accordance with a second resource amount (Pu) available as the second resource, and a second resource usage (Up) as a ratio of an amount of a resource used in said second data transmission unit to the second resource amount,
wherein said resource control unit comprises:
means for calculating an unused amount of the resource at said base station by subtracting an in-use amount of the resource at said base station reported therefrom from a target value of the resource at said base station notified thereto in advance;
means for calculating a total reception power from said mobile station that transmits the data to said base station in the above second-recited step of transmitting under the control of a cell forming said base station, by multiplying, by the in-use amount of the resource, a ratio received scheduled enhanced dedicated channel (E-DCH) power share, reported from the base station, of the amount of the resource used in said second data transmission unit versus the in-use amount of the resource;

means for calculating an amount of the resource available as said second resource out of the entire amount of the resources of said base station by adding said total reception power to said unused amount of the resource; and means for calculating said second resource usage by dividing said total reception power by said amount of the resource available as said second resource.

19. A system according to claim 18, wherein the resource comprises a base station reception power.

20. A system according to claim 18, wherein the first scheduling method comprises a method of causing said base station to disable scheduling of the first resource for each mobile station.

21. A system according to claim 18, wherein said first data transmission unit transmits data using an uplink dedicated channel as a radio channel from each mobile station to said base station.

22. A system according to claim 18, wherein the second scheduling method comprises a method of causing said base station to perform scheduling of the second resource for each mobile station.

23. A system according to claim 18, wherein said second data transmission unit transmits data using an uplink dedicated channel used in an uplink high-speed packet transmission scheme as a radio channel from each mobile station to said base station.

24. A system according to claim 18, wherein said base station comprises a resource measurement unit which measures resources of all channels and a resource of an uplink radio channel used said second data transmission unit and notifies said radio control station of measurement values.

25. A system according to claim 18, wherein said radio control station further comprises a second resource state calculation unit which calculates the second resource amount and the second resource usage in accordance with resources of all channels and a resource of an uplink radio channel used in said second data transmission unit.

26. A system according to claim 18, wherein said resource control unit comprises a regulation unit which instructs establishment regulation of an uplink radio channel used in said first data transmission unit when a new cell load estimated when the uplink radio channel used in said first data transmission unit is established is not less than a predetermined threshold value and regulates use of the first resource by decreasing the predetermined threshold value.

27. A system according to claim 18, wherein said resource control unit comprises a first resource updating unit which instructs said base station to decrease a transmission rate of an uplink radio channel used in said first data transmission unit when regulating use of the first resource.

28. A system according to claim 18, wherein said resource control unit comprises a first resource updating unit which instructs said base station to release a resource of an uplink radio channel used in said first data transmission unit when regulating use of the first resource.

29. A system according to claim 18, wherein said resource control unit instructs said base station to regulate use of the first resource in at least one of a case in which the second resource amount is smaller than a predetermined resource threshold value and a case in which the second resource usage is larger than a predetermined usage threshold value.

30. A system according to claim 18, wherein
said radio control station further comprises a lower limit value calculation unit which calculates a lower limit value of the second resource amount which monotonically increases with an increase in the second resource usage, and
said resource control unit instructs said base station to regulate use of the first resource when the second resource amount is smaller than the lower limit value.

31. A system according to claim 18, wherein
said radio control station further comprises an unused resource calculation unit which calculates an unused resource from the second resource amount and the second resource usage, and
said resource control unit instructs said base station to regulate use of the first resource when the unused resource is smaller than a predetermined resource threshold value.

32. A system according to claim 18, wherein the resource comprises a frequency band.

33. A system according to claim 18, wherein the first scheduling method comprises a method of scheduling to allow said mobile station to use the first resource at a predetermined transmission timing.

34. A system according to claim 18, wherein the second scheduling method comprises a method of dynamically assigning the second resource between a plurality of mobile stations for each minimum transmission time unit.

35. A wireless communication system comprising:
a plurality of mobile stations;
a base station which performs wireless communication with a mobile station in a cell using a resource assigned based on a predetermined scheduling method; and
a radio control station which controls use of the resource in wireless communication for said base station,
said mobile station comprising
first data transmission means for transmitting data to said base station using a first resource assigned based on a first scheduling method and
second data transmission means for transmitting data to said base station using a second resource which is assigned based on a second scheduling method and is not used in said first data transmission means, and
said radio control station comprising resource control means for instructing said base station to regulate use of the first resource in accordance with a second resource amount (Pu) available as the second resource, and a second resource usage (Up) as a ratio of an amount of a resource used in said second data transmission means to the second resource amount,
wherein said resource control unit comprises:
means for calculating an unused amount of the resource at said base station by subtracting an in-use amount of the resource at said base station reported therefrom from a target value of the resource at said base station notified thereto in advance;
means for calculating a total reception power from said mobile station that transmits the data to said base station in the above second-recited step of transmitting under the control of a cell forming said base station, by multiplying, by the in-use amount of the resource, a ratio received scheduled enhanced dedicated channel (E-DCH) power share, reported from the base station, of the amount of the resource used in said second data transmission means versus the in-use amount of the resource;

means for calculating an amount of the resource available as said second resource out of the entire amount of the resources of said base station by adding said total reception power to said unused amount of the resource; and means for calculating said second resource usage by dividing said total reception power by said amount of the resource available as said second resource.

36. A radio control station which controls use of resources in wireless communication for a base station which wirelessly communicates with a mobile station in a cell using a resource assigned based on a predetermined scheduling method, said mobile station comprising a first data transmission unit which transmits data to said base station using a first resource assigned based on a first scheduling method and a second data transmission unit which transmits data to said base station using a second resource which is assigned based on a second scheduling method and is not used in said first data transmission unit, and said radio control station comprising a resource control unit which instructs said base station to regulate use of the first resource in accordance with a second resource amount (Pu) available as the second resource, and a second resource usage (Up) as a ratio of an amount of a resource used in said second data transmission unit to the second resource amount, wherein said resource control unit comprises:

means for calculating an unused amount of the resource at said base station by subtracting an in-use amount of the resource at said base station reported therefrom from a target value of the resource at said base station notified thereto in advance;

means for calculating a total reception power from said mobile station that transmits the data to said base station in the above second-recited step of transmitting under the control of a cell forming said base station, by multiplying, by the in-use amount of the resource, a ratio received scheduled enhanced dedicated channel (E-DCH) power share, reported from the base station, of the amount of the resource used in said second data transmission unit versus the in-use amount of the resource;

means for calculating an amount of the resource available as said second resource out of the entire amount of the resources of said base station by adding said total reception power to said unused amount of the resource; and means for calculating said second resource usage by dividing said total reception power by said amount of the resource available as said second resource.

37. A radio control station according to claim 36, further comprising a second resource state calculation unit which calculates the second resource amount and the second resource usage in accordance with resources of all channels reported from said base station and a resource of an uplink radio channel used in said second data transmission unit.

38. A radio control station according to claim 36, wherein said resource control unit comprises a regulation unit which instructs establishment regulation of an uplink radio channel used in said first data transmission unit when a new cell load estimated when the uplink radio channel used in said first data transmission unit is established is not less than a predetermined threshold value and regulates use of the first resource by decreasing the predetermined threshold value.

39. A radio control station according to claim 36, wherein said resource control unit comprises a first resource updating unit which instructs said base station to decrease a transmission rate of an uplink radio channel used in said first data transmission unit when regulating use of the first resource.

40. A radio control station according to claim 36, wherein said resource control unit comprises a first resource updating unit which instructs said base station to release a resource of an uplink radio channel used in said first data transmission unit when regulating use of the first resource.

41. A radio control station according to claim 36, wherein said resource control unit instructs said base station to regulate use of the first resource in at least one of a case in which the second resource amount is smaller than a predetermined resource threshold value and a case in which the second resource usage is larger than a predetermined usage threshold value.

42. A system according to claim 36, further comprising a lower limit value calculation unit which a lower limit value of the second resource amount which monotonically increases with an increase in the second resource usage, wherein said resource control unit instructs said base station to regulate use of the first resource when the second resource amount is smaller than the lower limit value.

43. A radio control station according to claim 36, further comprising an unused resource calculation unit which calculates an unused resource from the second resource amount and the second resource usage, wherein said resource control unit instructs said base station to regulate use of the first resource when the unused resource is smaller than a predetermined resource threshold value.

44. A radio control station which controls use of resources in wireless communication for a base station which wirelessly communicates with a mobile station in a cell using a resource assigned based on a predetermined scheduling method, said mobile station comprising first data transmission means for transmitting data to said base station using a first resource assigned based on a first scheduling method and second data transmission means for transmitting data to said base station using a second resource which is assigned based on a second scheduling method and is not used in said first data transmission means, and said radio control station comprising resource control means for instructing said base station to regulate use of the first resource in accordance with a second resource amount (Pu) available as the second resource, and a second resource usage (Up) as a ratio of an amount of a resource used in said second data transmission means to the second resource amount, wherein said resource control unit comprises:

means for calculating an unused amount of the resource at said base station by subtracting an in-use amount of the resource at said base station reported therefrom from a target value of the resource at said base station notified thereto in advance;

means for calculating a total reception power from said mobile station that transmits the data to said base station in the above second-recited step of transmitting under the control of a cell forming said base station, by multiplying, by the in-use amount of the resource, a ratio received scheduled enhanced dedicated channel (E-DCH) power share, reported from the base station, of the amount of the resource used in said second data transmission means versus the in-use amount of the resource;

means for calculating an amount of the resource available as said second resource out of the entire amount of the resources of said base station by adding said total reception power to said unused amount of the resource; and means for calculating said second resource usage by dividing said total reception power by said amount of the resource available as said second resource.

* * * * *